United States Patent
Michaelis

(10) Patent No.: US 8,432,272 B2
(45) Date of Patent: Apr. 30, 2013

(54) DISPLAY DEVICE OF A MOTOR VEHICLE

(75) Inventor: Jan Michaelis, Berlin (DE)

(73) Assignee: Volkswagen AG, Wolfsburg (DE)

( * ) Notice: Subject to any disclaimer, the term of this patent is extended or adjusted under 35 U.S.C. 154(b) by 555 days.

(21) Appl. No.: 12/781,349

(22) Filed: May 17, 2010

(65) Prior Publication Data
US 2010/0302023 A1 Dec. 2, 2010

(30) Foreign Application Priority Data
May 29, 2009 (DE) .......................... 10 2009 023 203

(51) Int. Cl.
B60Q 1/00 (2006.01)
G09F 9/00 (2006.01)
G02B 27/14 (2006.01)
G09G 5/00 (2006.01)

(52) U.S. Cl.
USPC ............................... 340/461; 359/630; 345/7

(58) Field of Classification Search .................. 340/461, 340/438, 441, 980; 359/630; 345/7
See application file for complete search history.

(56) References Cited

U.S. PATENT DOCUMENTS

| | | | |
|---|---|---|---|
| 5,148,146 A * | 9/1992 | Murphy ......................... | 340/461 |
| 6,511,194 B1 | 1/2003 | Noll et al. ........................ | 362/23 |
| 6,682,201 B2 | 1/2004 | Kneer et al. ..................... | 362/26 |
| 6,714,327 B1 * | 3/2004 | Abersfelder et al. ........... | 359/13 |
| 7,619,826 B2 * | 11/2009 | Watanabe et al. .............. | 359/630 |
| 2002/0021500 A1 * | 2/2002 | Furuya ........................... | 359/630 |
| 2003/0116079 A1 | 6/2003 | Sugiyama et al. ............. | 116/305 |
| 2007/0115205 A1 * | 5/2007 | Uchiyama ......................... | 345/7 |
| 2008/0161997 A1 * | 7/2008 | Wengelnik et al. .............. | 701/36 |
| 2008/0224840 A1 * | 9/2008 | Kawachi ........................ | 340/438 |
| 2009/0015395 A1 * | 1/2009 | Rahe et al. ..................... | 340/461 |
| 2009/0067057 A1 * | 3/2009 | Sprague et al. ................ | 359/630 |
| 2009/0140845 A1 * | 6/2009 | Hioki ........................ | 340/425.5 |
| 2009/0205560 A1 | 8/2009 | Behrends et al. .............. | 116/334 |

FOREIGN PATENT DOCUMENTS

DE 706284 5/1941

(Continued)

OTHER PUBLICATIONS

German Office Action for Application No. 10 2009 023 203.6 (4 pages), Aug. 26, 2009.

(Continued)

Primary Examiner — Daniel Wu
Assistant Examiner — Mohamed Barakat
(74) Attorney, Agent, or Firm — King & Spalding L.L.P.

(57) ABSTRACT

A display device (1) of a motor vehicle, wherein the display device (1) has a display area having a display area center (3), wherein the display area has at least one inner area (4) and at least one lateral area (5), wherein the lateral area (5) is formed as a partial lateral area of a first cone which is characterized by an angle of aperture (φ) and a first cone axis (6), wherein a viewing ray (8) directed form at least one viewing unit (7) onto the display device center (3) intersects the first cone axis (6) in an intersecting angle (α) so that the sum of the half of the angle of aperture (φ/2) and the intersecting angle (α) is in an angular range from 75 degrees to 105 degrees, wherein the viewing unit (7) is positioned within a predefined position volume (11) in the motor vehicle.

18 Claims, 5 Drawing Sheets

FOREIGN PATENT DOCUMENTS

| | | |
|---|---|---|
| DE | 1713293 | 12/1955 |
| DE | 19941955 | 3/2001 |
| DE | 10064759 | 7/2002 |
| DE | 102005017313 | 10/2006 |
| DE | 102006038784 | 2/2008 |
| DE | 102007041742 | 7/2008 |

OTHER PUBLICATIONS

SAE J1052, "Surface Vehicle Recommended Practice: Motor Vehicle Driver and Passenger head Position." SAE, 400 Commonwealth Drive, Warrendale PA, 15096, USA (12 pages), Apr. 1, 1997.

* cited by examiner

DISPLAY DEVICE OF A MOTOR VEHICLE

CROSS-REFERENCE TO RELATED APPLICATIONS

This application claims priority to German Patent Application No. 10 2009 023 203.6 filed May 29, 2009, the contents of which is incorporated herein by reference in its entirety.

TECHNICAL FIELD

The invention relates to a display device of a motor vehicle.

BACKGROUND

As a general rule, display devices in motor vehicles serve the display of information for the passengers of the vehicle, in particular the vehicle driver. Amongst others, display devices may display the vehicle speed, the vehicle rpm or the fill level of a fuel tank. As a general rule, these display devices are arranged in the field of vision of the vehicle driver, for example as a component part of an instrument cluster.

Common display devices have a display area which may be partitioned into an inner area and a lateral area in some displays. For example, numerals may be arranged on the display area. In the case of a speed indicator these numerals for example display the range of the possible vehicle speed.

In order to achieve a perspectively correct three-dimensional display of the numerals, for example in a planar display area of the display device, the numerals are displayed smaller at the part of the display area most to the rear as seen from the viewer. However, this reduction results in a poor read-out of the numerals by the viewer.

An improved visibility of the numerals and therewith also an improved read-out may be achieved by an inclination of the lateral area for example with respect to the inner area. DE 100 64 759 A1 disclose a instrument dial comprising a basic body, wherein the basic body comprises an inside ring area and a further outside ring area the exterior of which each is formed by a tapered surface, wherein the tapered surface of the outside ring area is steeper than that of the inside ring area. It is further disclosed that depending on their relevance level symbols are formed on differently inclined surfaces je that the indicating instrument and the instrument dial, respectively, all in all are better readable. However, in doing so no exact specification of the inclination angle is disclosed but only a relative reference from an inner area to a lateral area which indicates that the lateral area is steeper than the inner area. However, therewith a reference of the symbols arranged on the lateral area to the viewer, in particular the vehicle driver, is missing.

DE 10 2006 038 784 A1 discloses a display device of a motor vehicle comprising an instrument dial which has a support layer, wherein the support layer is formed three-dimensional, preferably may be deep-drawn. The support layer has an upwardly flanged edge at the perimeter which comprises a cocked horse shoe shaped scale dial. Also here a specification of the upwardly flanged edge with respect to the position of the viewer, in particular the eye position of the vehicle driver, is missing.

The printed matter "SAE J1052, Motor Vehicle Driver and Head Position, SAE, 400 Commonwealth Drive, Warrendale, Pa. 15096, USA" discloses a method for determining a head position volume of static head positions of a vehicle driver in passenger vehicles (class A) and in heavy goods vehicles (class B). Thereby, the head position volume is determined depending on a variable or fixed vehicle seat reference position and depending on a torso angle which is specified by a vehicle or vehicle seat manufacturer. Further, the printed matter shows that there is a correlation between the head position and an eye position.

SUMMARY

According to various embodiments, a display device and/or a method for constituting a display device can be established which by means of comprehension of a predefined viewer position allow for a better reading precision of symbols and a perspectively correct display of the symbols.

According to an embodiment, a display device of a motor vehicle may have a display area comprising a display area center, wherein the display area has at least one inner area and at least one lateral area, wherein the lateral area is formed as a partial lateral area of a first cone which is characterized by an angle of aperture and a first cone axis, wherein a viewing ray directed form at least one viewing unit onto the display device center intersects the first cone axis in an intersecting angle so that the sum of the half of the angle of aperture and the intersecting angle is in an angular range from 75 degrees to 105 degrees, and wherein the viewing unit is positioned within a predefined position volume in the motor vehicle.

According to a further embodiment, the lateral area can be formed comprising at least one symbol and/or at least one symbol is arranged on the lateral area. According to a further embodiment, the symbols can be displayed in a distorted manner. According to a further embodiment, the inner area can be formed as a partial lateral area of a second cone. According to a further embodiment, the lateral area may enclose the inner area.

According to another embodiment, a display device of a motor vehicle may have a display area comprising a display area center, wherein the display area has at least one inner area and at least one lateral area, wherein the lateral area is formed as a partial area of at least one lateral area of a first pyramid, wherein a viewing ray directed from at least one viewing unit onto the display device center confines an angular range from −15 degrees to 15 degrees together with a normal vector of the lateral area, wherein the viewing unit is positioned within a predefined position volume in the motor vehicle.

According to yet another embodiment, in a method for displaying a display device by means of a display unit, wherein the display device has a display area comprising a display area center, wherein the display area has at least one inner area and at least one lateral area, and wherein the lateral area is formed as a partial lateral area of a first cone which is characterized by an angle of aperture and a first cone axis, an evaluation and control unit calculates a virtual image of the display device and displays the virtual image two-dimensional on the display unit, wherein the virtual image is the image of the display device taken by a virtual viewing unit, wherein a viewing ray directed from the virtual viewing unit onto the display device center intersects the first cone axis in an intersecting angle so that the sum of a half of the angle of aperture and the intersecting angle is in an angular range from 75 degrees to 105, wherein the virtual viewing unit is positioned within a predefined position volume in the motor vehicle.

According to yet another embodiment, in a method for displaying a display device by means of a display unit, wherein die display device has a display area comprising a display area center, wherein the display area has at least one inner area and at least one lateral area, and wherein the lateral area is formed as a partial area of at least one lateral area of a first pyramid, an evaluation and control unit calculates an virtual image of the display device and displays the virtual image two-dimensional on the display unit, wherein the virtual image is the image of the display device taken by a virtual viewing unit, wherein a viewing ray directed from the virtual viewing unit onto the display device center confines an angular range from −15 degrees to 15 degrees together with a normal vector of the lateral area, wherein the virtual viewing unit is positioned within a predefined position volume in the motor vehicle.

According to a further embodiment of one of the above methods, the display device can be stored in a memory device as a virtual model or may be calculated by the evaluation and control unit.

According to yet another embodiment, a device for displaying a display device may comprise at least one display unit and one evaluation and control unit, wherein the display device has a display area comprising a display area center, wherein the display area has at least one inner area and at least one lateral area, wherein the lateral area is formed as a partial lateral area of a first cone which is characterized by an angle of aperture and a first cone axis, wherein the evaluation and control unit calculates a virtual image of the display device and displays the virtual image two-dimensional on the display unit, wherein the virtual image is the image of the display device taken by a virtual viewing unit, wherein a viewing ray directed from the virtual viewing unit onto the display device center intersects the first cone axis in an intersecting angle so that the sum of the half of the angle of aperture and the intersecting angle is in an angular range from 75 degrees to 105 degrees, wherein the virtual viewing unit is positioned within a predefined position volume in the motor vehicle.

According to yet another embodiment, a device for displaying a display device may comprise at least one display unit and one evaluation and control unit, wherein the display device has a display area comprising a display area center, wherein the display area has at least one inner area and at least one lateral area, wherein the lateral area is formed as a partial area of at least one lateral area of a first pyramid, wherein the evaluation and control unit calculates a virtual image of the display device and displays the virtual image two-dimensional on the display unit, wherein the virtual image is the image of the display device taken by a virtual viewing unit, wherein a viewing ray directed from the virtual viewing unit onto the display device center confines an angular range from −15 degrees to 15 degrees together with a normal vector of the lateral area, wherein the virtual viewing unit is positioned within a predefined position volume in the motor vehicle.

BRIEF DESCRIPTION OF THE DRAWINGS

The invention is described in more detail on the basis of two exemplary embodiments. In the drawings.

DETAILED DESCRIPTION

Figure 1:
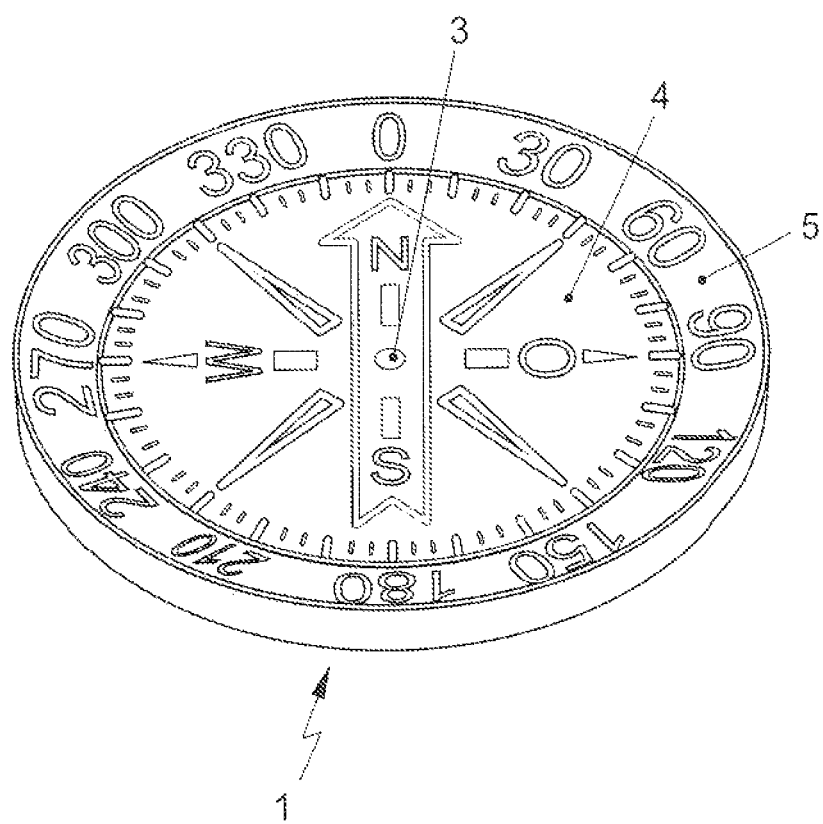
FIG. 1 shows a compass disc.

In this connection a display device of a motor vehicle has a display area comprising a display area center, wherein the display area has at least one inner area and at least one lateral area, wherein the lateral area is formed as a partial lateral area of a first cone characterized by an angle of aperture $\phi$ and a first cone axis, wherein a viewing ray of at least one viewing unit directed onto the display device center cuts the first cone axis in an intersecting angle $\alpha$ such that the sum of the half of the angle of aperture $\phi/2$ and the intersecting angle $\alpha$ is in a angular range ranging from 75° to 105°, wherein the viewing unit is positioned inside of a predefined position volume in the motor vehicle. As a general rule, in doing so the viewing unit indicates one or both eyes of a vehicle driver. The predefined position volume inside the motor vehicle indicates a so called eye box which delineates a volume which is dependent on the vehicle and/or a vehicle seat and in which one or both eyes of the motor vehicle driver reside in a normal case. The predefined position volume of the viewing unit thereby is determined analogous to the method for determining a statistical head position volume disclosed in "SAE J1052, Motor Vehicle Drier and Head Position, SAE, 400 Commonwealth Drive, Warrendale, Pa. 15096, USA" and the correlation between a head position and an eye position. The statistic head position volume thereby is determined depending on a variable or fixed vehicle seat reference position and depending on a torso angle specified by a vehicle or vehicle seat manufacturer. Thereby, also the predefined position volume of the viewing unit is determined depending on a variable or fixed vehicle seat reference position and depending on a torso angle specified by a vehicle or vehicle seat manufacturer.

The display device described in an advantageous manner allows for that the lateral area is formed such that the geometric relation between the viewing ray, the first cone axis and the half of the angle of aperture $\phi/2$ assures that the viewing unit looks onto at least a portion of the lateral area in an approximately perpendicular manner. The half of the angle of aperture $\phi/2$ thereby for example comprises an angle interval ranging from 30° to 89°, preferably may be 65° to 75°. Thereby it is also conceivable that the half of the angle of aperture $\phi/2$ assume an angle of 90° whereby, strictly speaking, the lateral area is not anymore a partial lateral area of a first cone. The sum of the half of the angle of aperture $\phi/2$ and the intersecting angle $\alpha$ being in an angular range from 75° to 105° assures a perspectively correct display also for slightly variable positions of the viewing unit. Thereby it is also conceivable to select a smaller angular range in which the initial angle is not 75° but is in an interval of initial angles of for example 75° to 89°, preferably at 85° and/or a terminal angle is not 105° but is in an interval of terminal angles of 91° to 105°, preferably at 95°. In an embodiment the sum of the half of the angle of aperture $\phi/2$ and the intersecting angle $\alpha$ is exactly 90°.

In an embodiment the lateral area is formed comprising at least one symbol and/or at least one symbol is arranged on the lateral area. By means of the arrangement of symbols on the lateral area a perspectively correct 3D display is simplified especially for the viewing unit. For example, the display device may be formed as a compass, wherein numerals are arranged on the lateral area which displays digits in the range from 0 to 330. For example, the display device may also be designed as a speed indicator. In this connection, the symbols are numerals reflecting the range of the vehicle speed, for example 0 to 240. In addition other embodiments of the display device are of course conceivable, for example as an rpm indicator.

In a further embodiment the symbols are displayed in a distorted manner. A distorted display of a symbol for example results from elongation, compression, rotation, distortion, magnification, diminution or shear of the standard display of the symbol, wherein the standard display of the symbol indicates the display of the symbol which is created by the symbol when it is displayed on a planar plane with a viewing angle of 90 degrees, i.e. with a viewing direction perpendicular to the planar plane. In the particular case in which the half of the angle of aperture is 90°, however, by means of the distorted display of the symbol or the symbols a perspectively correct 3D impression of the symbol, as seen from the direction of the viewing unit, may be achieved.

In a further embodiment the inner area is formed as a partial lateral area of a second cone. Preferably, in doing so the first and the second cone may have different angles of aperture. Hereby it is achieved that the display of symbols on the inner area is less falsified for the viewing unit as if the inner area would be formed as a planar circular surface, for example.

In an embodiment the lateral area encloses the inner area.

In an alternative embodiment a display device has a display area comprising a display area center, wherein the display area has at least one inner area and at least one lateral area, wherein the lateral area is formed as a partial area of at least one lateral area of a first pyramid, wherein a viewing ray directed onto the display device center by at least one viewing unit confines a angular range from −15° to 15° together with a normal vector of the lateral area, wherein the viewing unit is positioned within a predefined position volume in the motor vehicle. By means of the formation of the lateral area as a partial area of a lateral area of a pyramid it is ensured that the lateral areas do not have a curvature caused by a partial area of a lateral cone area which conduces to a simplified application of numerals, for example. The advantages of the embodiment described arise along the lines of the advantages mentioned previously.

In a method for displaying a display device an evaluation and control unit calculates a virtual image of the display device and displays the virtual image two-dimensional on a display unit, wherein the display device has a display area comprising a display area center, wherein the display area has at least one inner area and at least one lateral area, wherein the lateral area is formed as a partial lateral area of a first cone which is characterized by an angle of aperture and a first cone axis, wherein the virtual image is the image of the display device taken by a virtual viewing unit, wherein a viewing ray directed from the virtual viewing unit onto the display device center intersects the first cone axis in an intersecting angle so that the sum of the half of the angle of aperture and the intersecting angle is in a angular range of 75 degrees to 105 degrees, wherein the virtual viewing unit is positioned within a predefined position volume in the motor vehicle. Hereby it advantageously arises that a visual impression resulting from the previously described viewing of the three-dimensional display device actually positioned in the vehicle by the motor vehicle driver is also achieved by the two-dimensional display of the display device on a display unit, for example on a screen. For this, existing displays, for instance in an instrument cluster or in a center console of the vehicle, may be used.

In order to perform the method described the evaluation and control unit accesses information related to the position and orientation of the display device in the vehicle. In doing so, the display device may actually be positioned in the vehicle. However, in the method described the display device preferably may be positioned virtual in the vehicle and not in real terms. The information about position and orientation of the virtual display device then corresponds to a predefined virtual position and orientation in the coordinate system of the motor vehicle which optionally may be defined by the user. By means of the virtual viewing unit whose virtual position and orientation in the coordinate system of the motor vehicle is confined by the predefined position volume a virtual image of the virtual display device is then calculated. Therewith the virtual display device is viewed using the same general conditions as a display device arranged in real terms is viewed from the eyes of the motor vehicle driver.

It is conceivable that the virtual position of the virtual viewing unit is predetermined or is determined by means of a unit for determining an eye position, and a viewing direction and a head position, respectively.

The virtual image such calculated by the control and evaluation unit then is displayed two-dimensional on the display unit and therewith effects a similar visual impression as the viewing of a real display device.

In a further method for displaying a display device an evaluation and control unit calculates a virtual image of the display device and displays the virtual image two-dimensional on a display unit, wherein the display device has a display area comprising a display area center, wherein the display area has at least one inner area and at least one lateral area, wherein the lateral area is formed as a partial area of at least one lateral area of a first pyramid, wherein the virtual image is the image of the display device taken by a virtual viewing unit, wherein a viewing ray directed from the virtual viewing unit onto the display device center confines an angular range from −15 degrees to 15 degrees together with a normal vector of the lateral area, wherein the virtual viewing unit is positioned within a predefined position volume in the motor vehicle.

In an embodiment the display device can be stored in a memory device as a virtual model or is calculated by the evaluation and control unit. By means of storing the display device as a virtual model in the memory device it arises in an advantageous manner that the images of the display device taken by the virtual viewing unit prior to operation may be stored in the memory and may be used during operation. This saves a re-calculation of the virtual images and hence increases the displaying speed.

A device for displaying a display device comprises at least one display unit and one evaluation and control unit, wherein the display device has a display area comprising a display area center, wherein the display area has at least one inner area and at least one lateral area, wherein the lateral area is formed as a partial lateral area of a first cone which is characterized by an angle of aperture and a first cone axis, wherein the evaluation and control unit calculates a virtual image of the display device and displays the virtual image two-dimensional on the display unit, wherein the virtual image is the image of the display device taken by a virtual viewing unit, wherein a viewing ray directed from the virtual viewing unit onto the display device center intersects the first cone axis in an intersecting angle so that the sum of the half of the angle of aperture and the intersecting angle is in an angular range of 75 degrees to 105 degrees, wherein the virtual viewing unit is positioned within a predefined position volume in the motor vehicle. In doing so, the display device may be positioned real or virtual in the coordinate system of the motor vehicle.

A further device for displaying a display device comprises at least one display unit and one evaluation and control unit, wherein the display device has a display area comprising a display area center, wherein the display area has at least one inner area and at least one lateral area, wherein the lateral area is formed as a partial area of at least one lateral area of a first pyramid, wherein the evaluation and control unit calculates a virtual image of the display device and displays the virtual image two-dimensional on the display unit, wherein the virtual image is the image of the display device taken by a virtual viewing unit, wherein a viewing ray directed from the virtual viewing unit onto the display device center confines an angular range from −15 degrees to 15 degrees together with a normal vector of the lateral area, wherein the virtual viewing unit is positioned within a predefined position volume in the motor vehicle.

In order to describe the first exemplary embodiment FIG. 1 shows a display device 1 of a motor vehicle which is formed as a compass. Thereby, the display device 1 has a display area comprising a display area center 3. The display area thereby comprises an inner area 4 on which symbols N, O, S, W are arranged which indicate the orientations North (N), East (O), South (S) and West (W). The inner area 4 thereby is formed as a planar circular surface. Further, the inner area 4 shows a scale division which allows for an improved determination of an angle value. Arranged on the lateral area 5 are numerals 0, 30, 60, 90, 120, 150, 180, 210, 240, 270, 300 and 330. The lateral area 5 is formed as a partial lateral area of a first cone.

Figure 2:
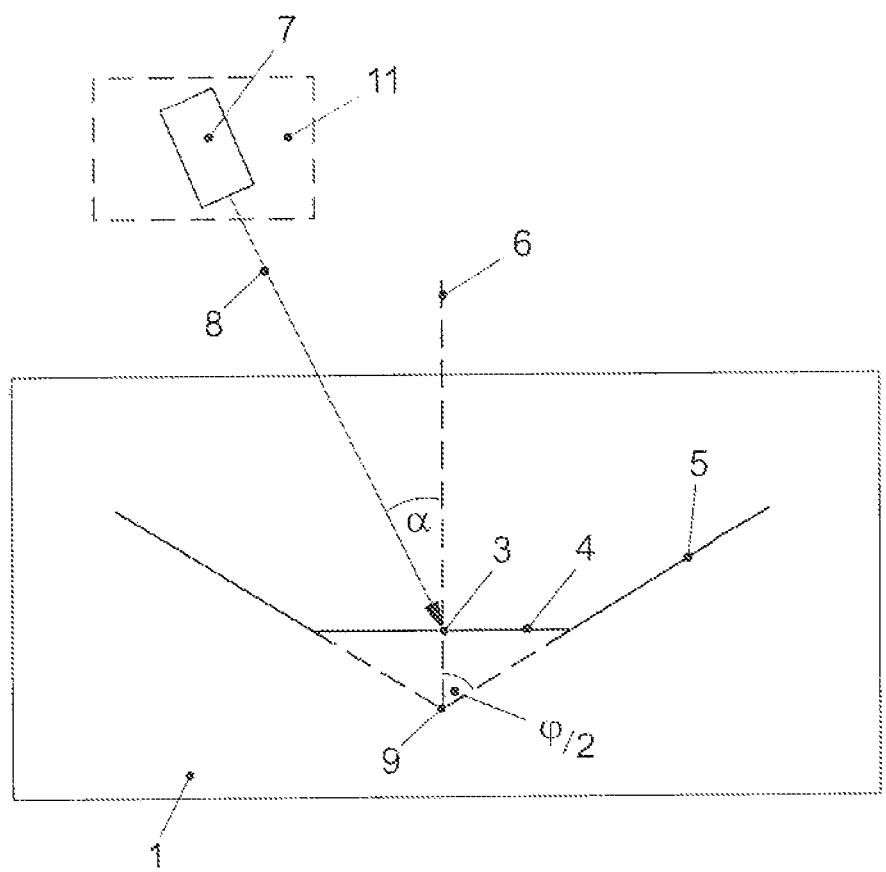
FIG. 2 shows a cross-sectional view of the display device comprising a cone-shaped design of the lateral area.

FIG. 2 shows a cross section of the display device 1 and the viewing unit 7. A viewing ray 8 directed from the viewing unit 7 onto the display device center 3 intersects a first cone axis 6 of the first cone in an intersecting angle α. The first cone has an angle of aperture φ and a virtual apex 9. The lateral area 5 of the display device 1 thereby is formed such that the sum of the half of the angle of aperture φ/2 and the intersecting angle α is in an angular range from 85° to 95° degrees. Thereby the viewing unit 7 is positioned within a predefined position volume 11 in the motor vehicle.

Figure 3:
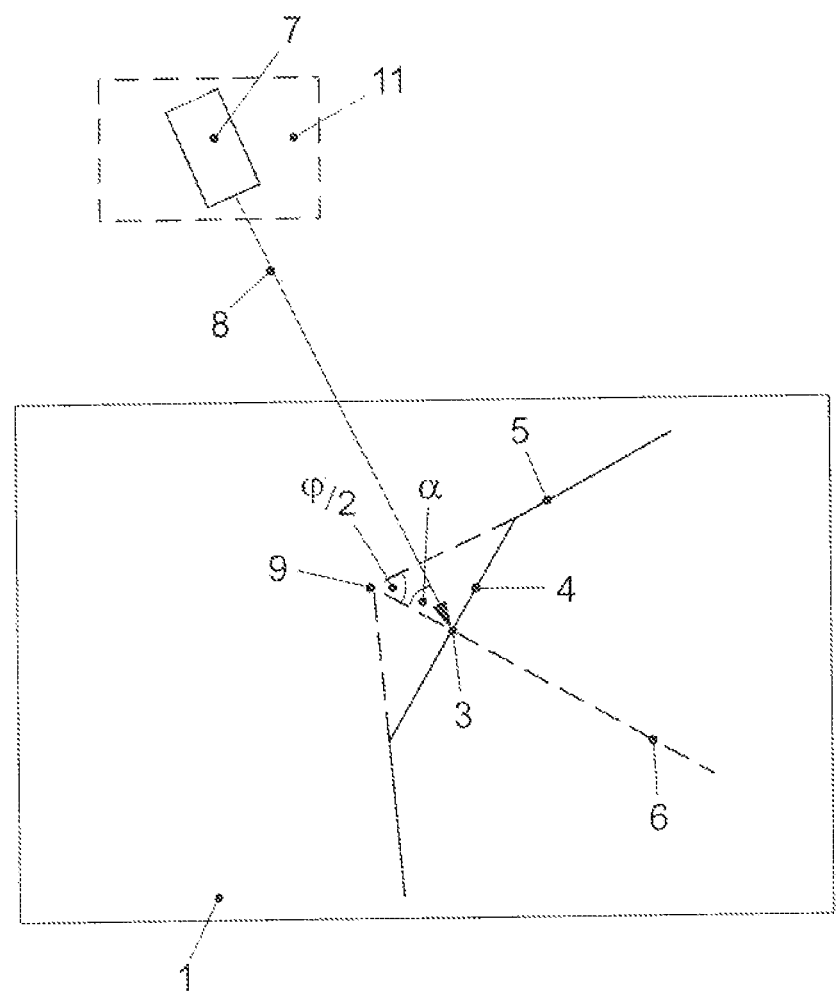
FIG. 3 shows a cross-sectional view of the display device comprising a cone-shaped design of the lateral area.

FIG. 3 shows a cross section of the display device 1 and the viewing unit 7, wherein the display area of the display device 1 is tilted compared to the embodiment depicted in FIG. 1. In this connection, the virtual apex 9 of the first cone does not lie behind the display area as seen from the viewing unit but in front of the display area as seen from the viewing unit 7.

Figure 4:
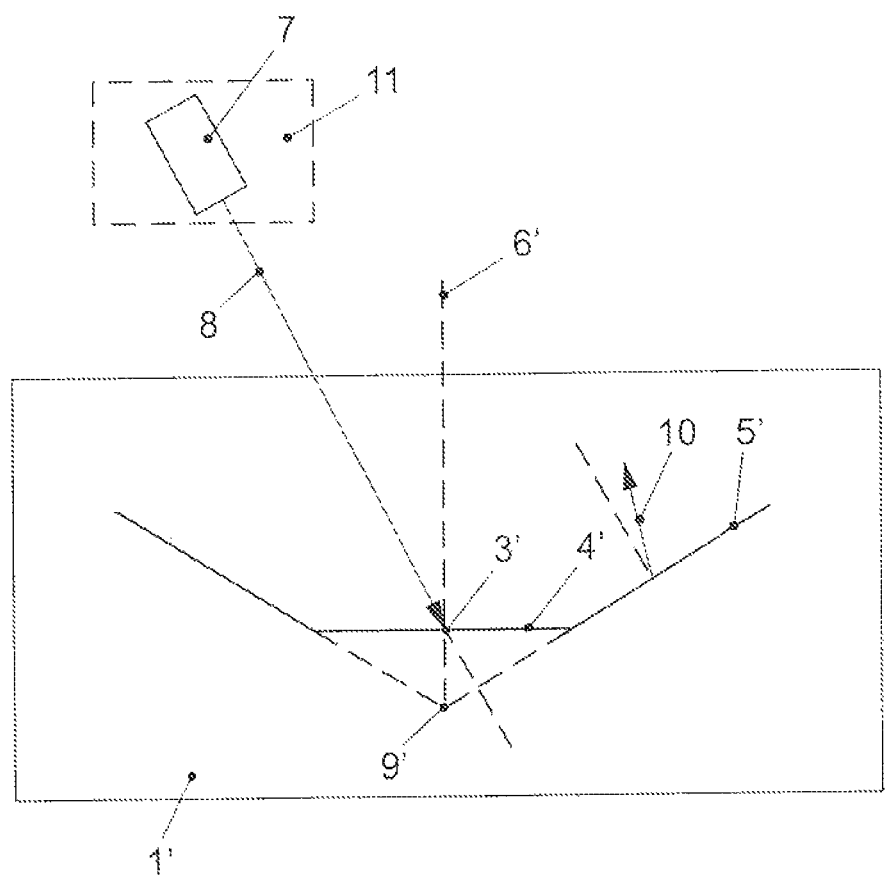
FIG. 4 shows a cross-sectional view of the display device comprising a pyramid-shaped design of the lateral area.
Figure 5:
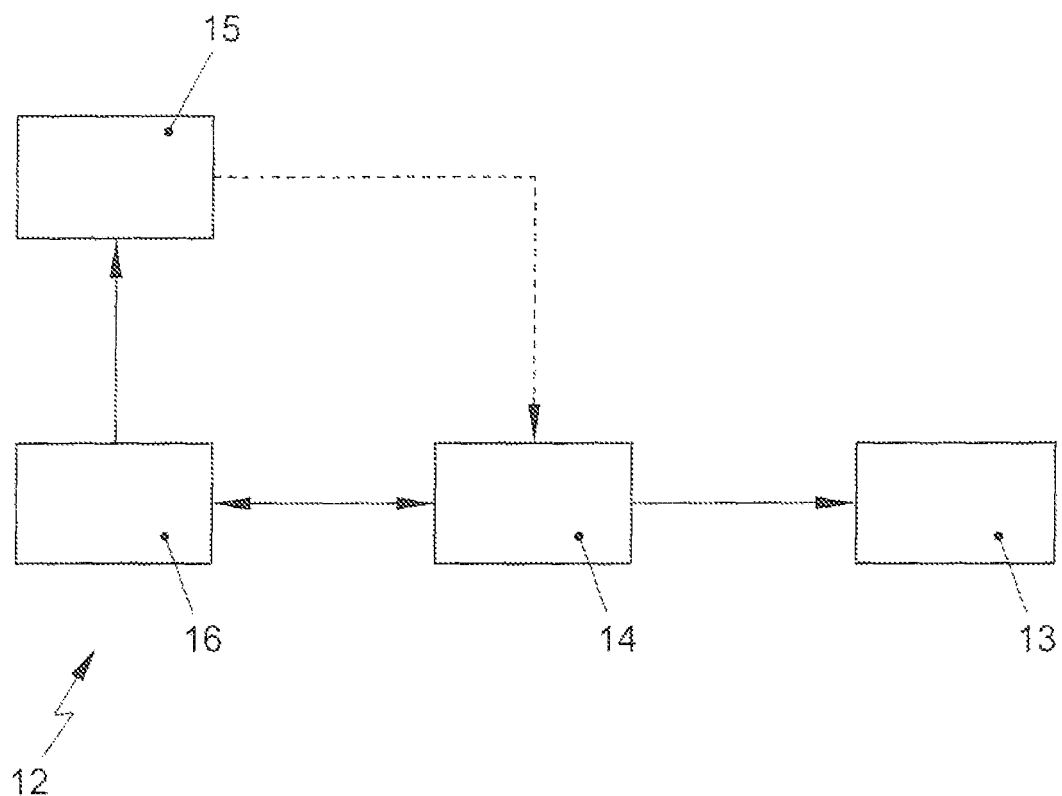
FIG. 5 shows a schematic block diagram of a device for displaying a display device.

FIG. 4 shows a cross section of the display device 1' and the viewing unit 7, wherein die display device 1' has a display area which again has a display area center 3', an inner area 4' and a lateral area 5'. The lateral area 5' is formed as a partial area of a lateral area of a first pyramid. The first pyramid has a virtual pyramid apex 9'. It is illustrated in FIG. 4 that the pyramid is formed as a regular pyramid, wherein in a regular pyramid the base area is a regular polygon and the center of this polygon at the same time is the base point of the pyramid height 6'. It is also conceivable that the pyramid is formed as an upright pyramid or an inclined pyramid or a tetrahedon. The lateral area 5' has a normal vector 10, wherein the viewing ray 8 directed from the viewing unit 7 onto the display device center 3' confines an angular range from −15° to 15° together with the normal vector 10 of the lateral area. The viewing unit 7 is positioned within a predefined position volume 11 in the motor vehicle. In a second exemplary embodiment the display of the display device 1 is carried out by means of a device 12 for displaying the display device 1 depicted in FIG. 5. It comprises a display unit 13 and an evaluation and control unit 14. The display device 1 has the display area comprising the display area center 3, wherein the display area has the inner area 4 and the lateral area as described previously. The lateral area 5 is formed as a partial lateral area of the first cone which is characterized by the angle of aperture φ and the first cone axis 6. The display device 1 characterized such is stored in a memory device 15 as a virtual model comprising a virtual position and orientation in the coordinate system of the motor vehicle. By means of the virtual model and a virtual viewing unit 16 the evaluation and control unit 14 calculates a virtual image of the display device 1 and two-dimensional displays this virtual image on the display unit 13. The position of the virtual viewing unit 16 in the coordinate system of the motor vehicle is defined by the predefined position volume 11. Thereby it is conceivable that the virtual image of the display device is re-calculated during the operation or that a number of virtual images, for example from several virtual positions, is calculated prior to operation and also is stored in the memory device 15. During operation the evaluation and control unit 14 then accesses the number of virtual images (dashed line in FIG. 5) which allows for an accelerated display of the virtual image.

Thus, the virtual image is the image of the display device 1 taken by the virtual viewing unit 16. In order to achieve a similar visual impression as in viewing a real display device 1 through the eyes of the motor vehicle driver a viewing ray 8 directed from the virtual viewing unit 16 onto the display device center 3 intersects the first cone axis 6 in an intersecting angle α so that the sum of the half of the angle of aperture φ/2 and the intersecting angle α is in an angular range from 75 degrees to 105 degrees.

What is claimed is:

1. A display device of a motor vehicle, wherein the display device has a display area comprising a display area center, wherein the display area has at least one inner area and at least one lateral area, wherein the lateral area is formed as a partial lateral area of a first cone which is characterized by an angle of aperture and a first cone axis, wherein a viewing ray directed form at least one viewing unit onto the display device center intersects the first cone axis in an intersecting angle so that the sum of the half of the angle of aperture and the intersecting angle is in an angular range from 75 degrees to 105 degrees, wherein the viewing unit is positioned within a predefined position volume in the motor vehicle.

2. The display device according to claim 1, with at least one of: the lateral area is formed comprising at least one symbol and at least one symbol is arranged on the lateral area.

3. The display device according to claim 2, wherein the symbols are displayed in a distorted manner.

4. The display device according to claim 1, wherein the inner area is formed as a partial lateral area of a second cone.

5. The display device according to claim 1, wherein the lateral area encloses the inner area.

6. A display device of a motor vehicle comprising a display area comprising a display area center, wherein the display area has at least one inner area and at least one lateral area, wherein the lateral area is formed as a partial area of at least one lateral area of a first pyramid, wherein a viewing ray directed from at least one viewing unit onto the display device center confines an angular range from −15 degrees to 15 degrees together with a normal vector of the lateral area, wherein the viewing unit is positioned within a predefined position volume in the motor vehicle.

7. A method for displaying a display device by means of a display unit,
wherein the display device has a display area comprising a display area center, wherein the display area has at least one inner area and at least one lateral area, wherein the lateral area is formed as a partial lateral area of a first cone which is characterized by an angle of aperture and a first cone axis, the method comprising the steps of:
calculating by an evaluation and control unit a virtual image of the display device and displaying the virtual image two-dimensional on the display unit, wherein the virtual image is the image of the display device taken by a virtual viewing unit, wherein a viewing ray directed from the virtual viewing unit onto the display device center intersects the first cone axis in an intersecting angle so that the sum of a half of the angle of aperture and the intersecting angle is in an angular range from 75 degrees to 105, and wherein the virtual viewing unit is positioned within a predefined position volume in the motor vehicle.

8. The method according to claim 7, wherein the display device is stored in a memory device as a virtual model or is calculated by the evaluation and control unit.

9. A method for displaying a display device by means of a display unit,
wherein die display device has a display area comprising a display area center, wherein the display area has at least one inner area and at least one lateral area, wherein the lateral area is formed as a partial area of at least one lateral area of a first pyramid, the method comprising the steps of:
calculating by an evaluation and control unit a virtual image of the display device and displaying the virtual image two-dimensional on the display unit, wherein the virtual image is the image of the display device taken by a virtual viewing unit, wherein a viewing ray directed from the virtual viewing unit onto the display device center confines an angular range from −15 degrees to 15 degrees together with a normal vector of the lateral area, wherein the virtual viewing unit is positioned within a predefined position volume in the motor vehicle.

10. The method according to claim 9, wherein the display device is stored in a memory device as a virtual model or is calculated by the evaluation and control unit.

11. A device for displaying a display device, comprising at least one display unit and one evaluation and control unit, wherein the display device has a display area comprising a display area center, wherein the display area has at least one inner area and at least one lateral area, wherein the lateral area is formed as a partial lateral area of a first cone which is characterized by an angle of aperture and a first cone axis, wherein the evaluation and control unit is operable to calculate a virtual image of the display device and displays the virtual image two-dimensional on the display unit, wherein the virtual image is the image of the display device taken by a virtual viewing unit, wherein a viewing ray directed from the virtual viewing unit onto the display device center intersects the first cone axis in an intersecting angle so that the sum of the half of the angle of aperture and the intersecting angle is in an angular range from 75 degrees to 105 degrees, and wherein the virtual viewing unit is positioned within a predefined position volume in the motor vehicle.

12. The device according to claim 11, further comprising a memory device storing the display device as a virtual model.

13. The device according to claim 11, with at least one of: the lateral area is formed comprising at least one symbol and at least one symbol is arranged on the lateral area.

14. The device according to claim 13, wherein the symbols are displayed in a distorted manner.

15. The device according to claim 11, wherein the inner area is formed as a partial lateral area of a second cone.

16. The device according to claim 11, wherein the lateral area encloses the inner area.

17. A device for displaying a display device, comprising at least one display unit and one evaluation and control unit, wherein the display device has a display area comprising a display area center, wherein the display area has at least one inner area and at least one lateral area, wherein the lateral area is formed as a partial area of at least one lateral area of a first pyramid, wherein the evaluation and control unit is operable to calculate a virtual image of the display device and displays the virtual image two-dimensional on the display unit, wherein the virtual image is the image of the display device taken by a virtual viewing unit, wherein a viewing ray directed from the virtual viewing unit onto the display device center confines an angular range from −15 degrees to 15 degrees together with a normal vector of the lateral area, and wherein the virtual viewing unit is positioned within a predefined position volume in the motor vehicle.

18. The device according to claim 17, further comprising a memory device storing the display device as a virtual model.

* * * * *